(12) United States Patent
Ritmiller

(10) Patent No.: US 7,291,818 B1
(45) Date of Patent: Nov. 6, 2007

(54) MICROWAVE BEVERAGE BREWING CONTAINER

(76) Inventor: Stephen J. Ritmiller, 110 Pinehurst Dr., Cranberry Township, PA (US) 16066

( * ) Notice: Subject to any disclaimer, the term of this patent is extended or adjusted under 35 U.S.C. 154(b) by 0 days.

(21) Appl. No.: 11/437,975

(22) Filed: May 19, 2006

(51) Int. Cl.
*H05B 6/80* (2006.01)
*A47J 31/00* (2006.01)

(52) U.S. Cl. .................. 219/689; 219/732; 219/735; 426/241; 99/299; 99/DIG. 14

(58) Field of Classification Search ........ 219/687–689, 219/732, 762, 734–735; 426/241, 243, 432–435, 426/234; 99/299, 306, DIG. 14
See application file for complete search history.

(56) References Cited

U.S. PATENT DOCUMENTS

| 4,577,080 A | 3/1986 | Grossman | |
| 4,721,835 A * | 1/1988 | Welker | ........................ 219/689 |
| 4,900,886 A | 2/1990 | Bridges | |
| 4,908,222 A | 3/1990 | Yu | |
| 4,999,470 A | 3/1991 | Fuchs, Jr. | |
| 5,185,505 A | 2/1993 | Grzywana | |
| 5,832,809 A * | 11/1998 | Gras | .......................... 99/299 |
| 2001/0042446 A1* | 11/2001 | Denny | ....................... 99/323.3 |

* cited by examiner

*Primary Examiner*—Philip H. Leung
(74) *Attorney, Agent, or Firm*—James Ray & Assoc.

(57) ABSTRACT

An all-in-one microwave beverage brewing and storage container and a method of using such container for quickly and conveniently brewing and storing beverages such as coffee and/or tea. The device comprises a receptacle having an interior portion capable of holding a first predetermined amount of liquid. The receptacle has a sidewall having a flat surface to enable the receptacle to rest on its side while placed within a microwave energy source. A top portion is provided on the receptacle that is capable of preventing the first predetermined amount of liquid from leaking out of the receptacle while the receptacle is resting on its side. A venting member is provided for venting the liquid during brewing of the beverage within the microwave. Upon the completion of brewing, the receptacle may be turned upright and a second predetermined amount of water and/or ice may be added to finish preparing the beverage.

10 Claims, 2 Drawing Sheets

MICROWAVE BEVERAGE BREWING CONTAINER

FIELD OF THE INVENTION

The present invention relates in general to microwave containers and, more particularly, to microwave containers for quickly and conveniently brewing a preselected beverage, such as tea for iced tea or coffee.

BACKGROUND OF THE INVENTION

Ease of preparation has never been a strong selling point for tea. Approximately 85% of all tea consumed in the United States is iced. In this fast-paced society, convenience and quickness is a top priority when selecting a beverage. Although home-prepared tea costs approximately 3 cents per serving, consumers typically purchase ready-to-drink tea in bottles and cans because it is easier and more convenient than brewing their own at home. There is a need in the art for a home brewing device that is quick and easy to use. There is also a need in the art for an "all-in-one" convenient device that can be used for brewing, storing, and serving the iced tea.

Devices for brewing beverages in the microwave are known. See for example U.S. Pat. Nos. 5,185,505; 4,999,470; 4,908,222; 4,900,886; and 4,577,080. All of these microwave beverage brewing devices require the use of a filter along with the coffee/tea to allow the beverage to flow into a receptacle upon reaching a predetermined temperature. With the exception of the ('866) patent, all of these devices are limited to single serve devices. Even the ('866) device is limited to brewing small amounts of beverage. All of the devices in these references show a plurality of interworking components which are time consuming to assemble, cumbersome to use, and pose the risk of loss of one or more of these components, rendering the device useless. Additionally, the height of these devices may be too high to fit in microwave ovens that have limited height capacities.

There is a need in the art for a microwave beverage brewing device that is capable of brewing a large amount of beverage, using a limited number of components, and is capable of fitting within a majority of microwaves.

OBJECTS OF THE INVENTION

It is therefore an object of the invention to provide a device, which allows one to easily, and quickly brew a preselected beverage within a microwave energy source.

It is yet another object of the invention to provide a device which is convenient to use and can be accommodated by most microwave energy sources.

It is still another object of the invention to provide a device, which is an "all-in-one" container that can brew, store, and serve a beverage product.

It is yet another object of the invention to provide a device, which can be formed from a variety of sizes having up to at least a two quart capacity.

It is still yet another object of the invention to provide a device that is formed from a microwave safe plastic material that can withstand both heating and cooling and is dishwasher safe.

It is another object of the invention to provide a quick and easy method for preparing a freshly brewed beverage, such as iced tea by utilizing the convenience of a microwave energy source.

It is still another object of the invention to provide a method of preparing a brewed beverage by means of an "all-in-one" device that can be moved between the microwave energy source, the refrigerator, and the table.

In addition to the various objects and advantages of the invention which have been described in some specific detail above it should be noted that various other objects and advantages of the present invention will become more readily apparent to those persons who are skilled in the relevant art from the following more detailed description, particularly, when such description is taken in conjunction with the attached drawing Figures and with the appended claims.

SUMMARY OF THE INVENTION

Briefly, and in accordance with the forgoing objectives, the invention comprises an all-in-one microwave beverage brewing and storage container and a method of using such container for quickly and conveniently brewing and storing preselected beverages such as coffee and/or tea for iced tea. The device comprises a receptacle having an interior portion capable of holding a first predetermined amount of liquid. The receptacle has a sidewall having a flat surface to enable the receptacle to rest on its side while placed within a microwave energy source and a top portion that is capable of preventing the first predetermined amount of liquid from leaking out of the receptacle while resting on its side. A venting means is provided for venting the liquid during brewing of the beverage within the microwave. An inverted handle is formed in the flat surface so that the receptacle is capable laying flat while resting on its flat surface but has a size and shape to enable a user to grasp it and dispense the beverage when the receptacle is in an upright position. Upon the completion of brewing, the receptacle may be turned upright and a second predetermined amount of water and/or ice may be added to finish beverage preparation.

DETAILED DESCRIPTION OF THE DRAWINGS

Figure 1:
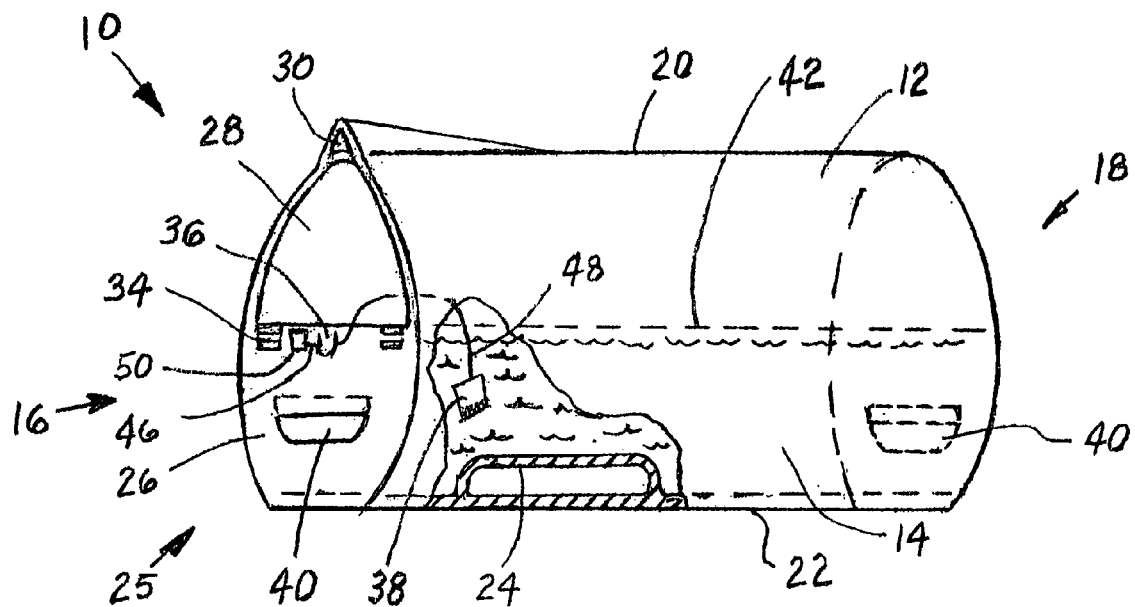
FIG. 1 shows a side view of the microwave beverage brewing device of the invention positioned on its side for placement within a microwave.

Before describing the invention in detail, the reader is advised that, for the sake of clarity and understanding, identical components having identical functions have been marked where possible with the same reference numerals in each of the Figures provided in this document.

Referring now to FIGS. 1-4, there is shown the device, generally illustrated as 10, for brewing a preselected beverage using a microwave energy source, such as a microwave oven, not shown. The device of the invention comprises a receptacle 12 having an interior portion capable of holding a first predetermined amount of liquid 14. The receptacle has a top portion 16, a bottom portion 18, and a sidewall portion 20, having a predetermined shape, extending between the top portion 16 and the bottom portion 18.

The predetermined shape of the sidewall 20 can be any well known shape such as cylindrical, rectangular, hexagonal, and the like. Preferably, the predetermined shape of the sidewall 20 is cylindrical.

At least one flat surface 22 is formed on the receptacle to enable the receptacle 12 to remain stationary while placed within the microwave energy source. Preferably the at least one flat surface 22 is formed on the sidewall 20 to enable the receptacle 12 to rest on its side while placed within a microwave energy source, not shown. The top portion 16 and the bottom portion 18 of the receptacle 12 is capable of preventing the first predetermined amount of liquid 14 from leaking out of the receptacle 12 while the receptacle 12 is resting on its side during brewing within the microwave energy source.

A handle means 24 is connected to the receptacle at a predetermined location for enabling easy handling of the receptacle 12. Preferably, the handle 24 is inverted and is formed in the at least one flat surface 22. The inverted handle 24 has a size and shape capable of allowing the receptacle to lie flat while resting on its at least one flat surface 22. This inverted handle 24 also has a size and shape capable of allowing one to grasp the receptacle 12 when in an upright position for carrying and/or pouring the beverage.

The receptacle top portion 16 comprises a lid, generally indicated at 25, having a closed portion 26 and an open portion 28. The closed portion 26 prevents the first predetermined amount of liquid 14 from leaking out of the receptacle 12 when the receptacle 12 is resting on its sides on its at least one flat surface 22. The open portion 28 of the top portion 16 acts as a venting means for venting the first predetermined amount of liquid 14 during heating and brewing of the beverage within the microwave energy source.

A pour spout 30 is formed within the receptacle sidewall 20 at a location opposite from the at least one flat surface 22 and the closed portion 26 of the top portion 16 and adjacent to the open portion 28 of the receptacle top portion 16.

Figure 2:
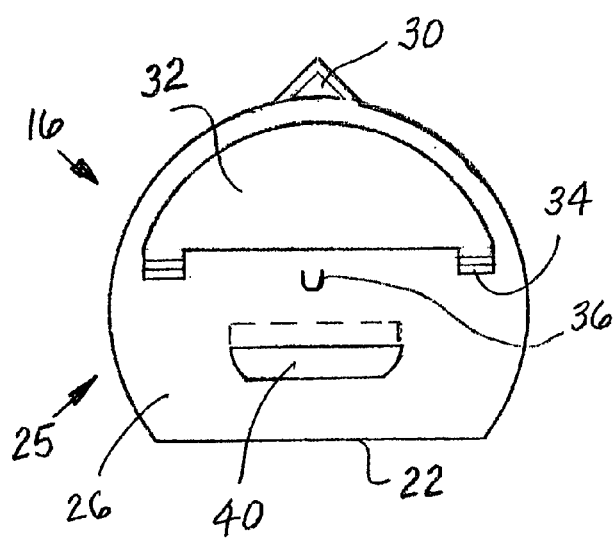
FIG. 2 shows a top view of the microwave beverage brewing device of the invention.
Figure 3:
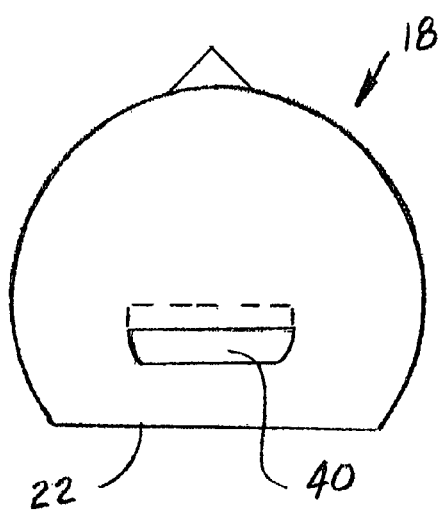
FIG. 3 shows a bottom view of the microwave beverage brewing device of the invention.
Figure 4:
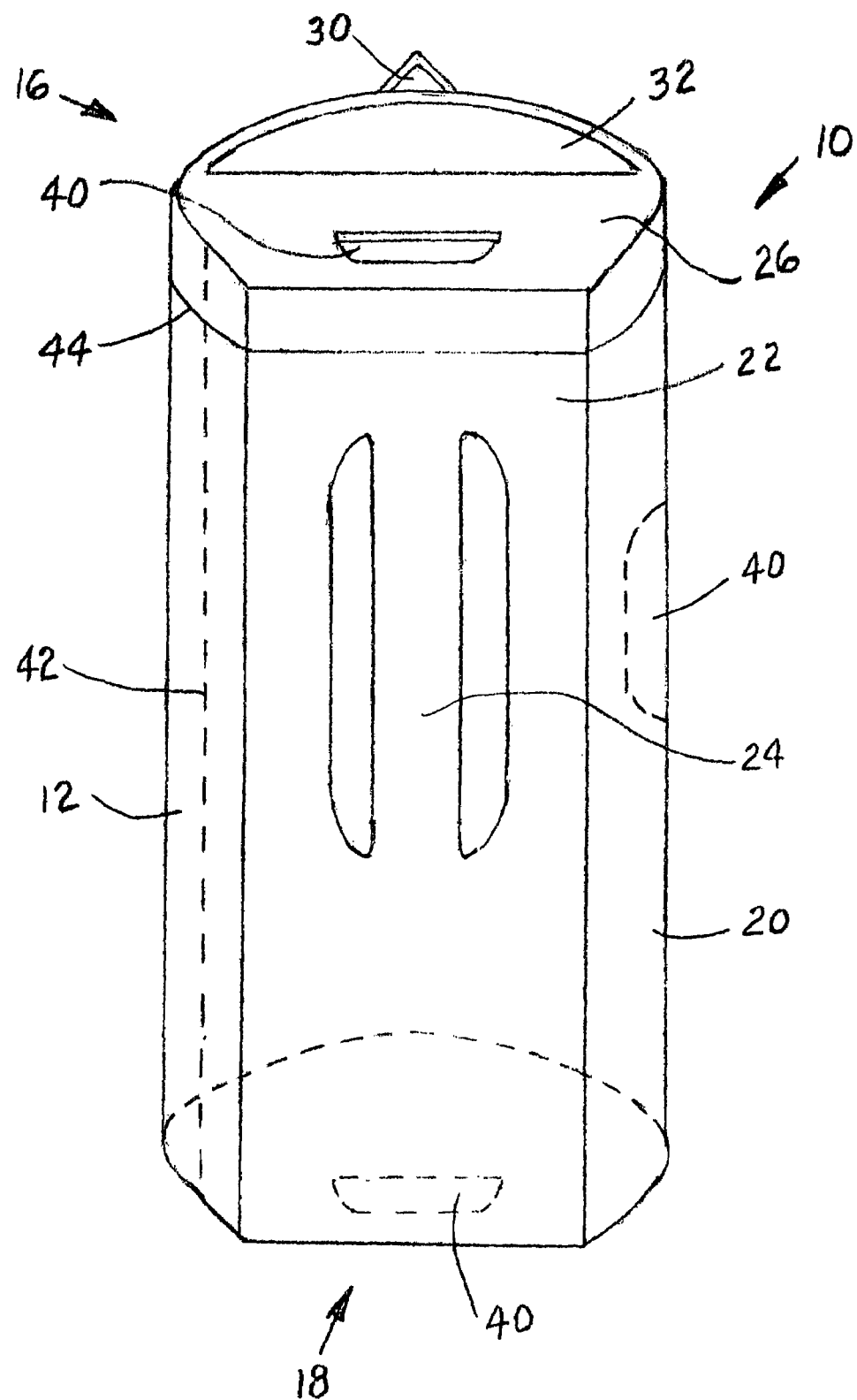
FIG. 4 shows a side view of the flat side of the microwave beverage brewing device of the invention in an upright position.

A closing member 32, as shown in FIG. 2, is provided for closing the open portion 28 of the receptacle top portion 16 during storage of the beverage. This closing member 32 can be a flip top lid and the receptacle top portion 16 can include means 34 for attaching the closing member 32 thereto. Alternatively, the closing member can be a separate lid member, which may be removed from the receptacle top portion 16 during brewing and then snapped into place during storage of the beverage.

At least one holding means 36 may be provided for holding at least one flavoring bag 38 during brewing of the beverage. The holding means may be a slit on the top surface of the closed portion of the lid 26, which is capable of holding a string of one or more flavoring bags 38. Any other well-known holding means, such as a clip, knob, and the like may be provided for holding the flavoring bag within the receptacle 12.

Handgrips 40 may be provided in the receptacle top portion 16, receptacle bottom portion 18 and receptacle sidewall 20 for handling the container during placement and removal from the microwave energy source and/or from the storage facility.

A first fill line 42 may be provided in the tubular sidewall 20 to denote an amount of the first predetermined liquid 14 to be placed within the receptacle for brewing. A second fill line 44 may also be provided to denote an amount of second predetermined liquid and/or ice to be placed within the receptacle after brewing to form the final beverage.

A method for brewing a preselected beverage using a microwave energy source is also taught by the present invention. This method comprises utilizing the microwave beverage brewing device 10 shown in FIGS. 1-4 and discussed in detail above. The method further includes the steps of placing a first predetermined amount of liquid 14 within the interior portion of the receptacle 12 of the device 10. Providing at least one flavoring bag 38, such as a tea bag, coffee bag, or any other well-known flavoring bag. This flavoring bag 38 has a first end 46 and second end 48. The first end 46 includes a holding means 50, such as a paper tab, and the second end 48 includes the flavoring bag. Securing this first end 46 of the at least one flavoring bag 38 to the receptacle top portion 16 such that the second end 48 including the flavoring bag extends into the receptacle 12. Placing the receptacle 12 within a microwave energy source, such as a microwave oven, not shown, such that the receptacle 12 lies on its at least one flat surface 22 and the at least one flavoring bag 38 falls within the first predetermined amount of liquid 14. The top portion 16 and bottom portion 18 of the receptacle 12 is designed such that the first predetermined amount of liquid 14 does not leak out of the receptacle 12 resting on its side during brewing within the microwave. Activating the microwave energy source to heat and brew the beverage and then removing the receptacle 12 from within the microwave oven, placing the receptacle 12 in an upright position and adding a second predetermined amount of liquid and/or ice to form a final beverage product.

As discussed above, the beverage brewing device includes an inverted handle 24 which allows the receptacle 12 to lie flat while resting on its at least one flat surface 22 and has a size and shape capable of allowing one to grasp the receptacle 12 when in an upright position for pouring of the beverage and/or transporting the beverage. The lid 25 includes a venting means and/or open portion 28 in the receptacle top portion 16 for venting the first predetermined amount of liquid 14 during brewing. The lid 25 also includes a closed portion 26 for preventing this first predetermined amount of liquid 14 from leaking out of the receptacle 12 when the receptacle is resting on its side within the microwave.

A pour spout 30, in a location opposite from the handle 24, is provided to assist the user in pouring the beverage into a cup or glass. A closing member 32 is also provided for closing the open portion 28 of the receptacle top portion 16 during storage of the beverage.

At least one holding means 36 may be provided on the receptacle top portion for securing the first end 46 of the at least one flavoring bag 38 during brewing of the beverage.

Handgrips 40 may be provided in at least one of the receptacle top portion 16, receptacle bottom portion 18 and receptacle sidewall 20 for handling the receptacle during placement and removal from the microwave and/or from the storage facility.

The invention has been described in such full, clear, concise, and exact terms so as to enable any person skilled in the art to which it pertains to make and use the same. It should be understood that variations, modifications, equivalents and substitutions for components of the specifically described embodiments of the invention may be made by those skilled in the art without departing from the spirit and scope of the invention as set forth in the appended claims. Persons who possess such skill will also recognize that the foregoing description is merely illustrative and not intended to limit any of the ensuing claims to any particular narrow interpretation.

I claim:

1. A method for brewing a preselected beverage using a microwave oven, said method comprising:
   (a) providing a receptacle having an interior portion capable of holding a first predetermined amount of liquid, said receptacle having a flat top portion, a flat bottom portion, and a sidewall portion having a predetermined shape extending between said top portion and said bottom portion, said receptacle including at least one flat surface formed on said sidewall portion to enable said receptacle to remain stationary while placed within such microwave oven and a pour spout within said receptacle sidewall at a location opposite from said at least one flat surface and adjacent to said top portion;
   (b) placing a first predetermined amount of liquid within said interior portion of said receptacle;
   (c) providing at least one flavoring bag having a first and second end, said first end including a holding means;
   (d) securing said holding means disposed at said first end of said at least one flavoring bag to said receptacle top portion such that said flavoring bag extends into said receptacle;
   (e) placing said receptacle within such microwave oven such that said receptacle lies on its at least one flat surface formed on said sidewall portion and said at least one flavoring bag falls within said first predetermined amount of liquid, said top portion and said bottom portion of said receptacle capable of preventing said first predetermined amount of liquid from leaking out during brewing of such preselected beverage within such microwave oven;
   (f) activating said microwave oven to heat and brew said beverage; and
   (g) removing said receptacle from within said microwave oven and adding a second predetermined amount of liquid to form a final beverage product.

2. The method, according to claim 1, wherein said predetermined shape of said sidewall is selected from cylindrical, rectangular and hexagonal.

3. The method, according to claim 2, wherein said predetermined shape of said sidewall is cylindrical.

4. The method, according to claim 1, wherein said handle means is an inverted handle formed in said at least one flat surface, said inverted handle having a size and shape capable of allowing said receptacle to lie flat while resting on said at least one flat surface.

5. A method, according to claim 1, comprising providing a venting means in said receptacle top portion for venting said first predetermined amount of liquid during heating and brewing within such microwave energy source.

6. The method, according to claim 5 wherein said receptacle top portion has a closed portion and an open portion, said closed portion preventing said first predetermined amount of liquid from leaking out of said receptacle when said receptacle is resting on said at least one flat surface and said open portion providing said venting means for venting said first predetermined amount of liquid during heating and brewing within said microwave.

7. The method, as recited in claim 6, comprising providing a closing member for closing said open portion of said receptacle top portion during storage of such beverage.

8. The method, as recited in claim 1,
   comprising providing at least one holding means on said receptacle top portion for securing said first end of said at least one flavoring bag during brewing of such beverage.

9. The method, as recited in claim 1,
   comprising providing handgrips in at least one of said receptacle top portion, receptacle bottom portion and receptacle sidewall for handling said container during placement and removal from said microwave and/or from a storage facility.

10. The method, as recited in claim 1 comprising the step of adding a predetermined amount of ice to such brewed beverage after removal thereof from such microwave oven.

* * * * *